H. WHITE.
Hand Weeding-Tool.
No. 220,102. Patented Sept. 30, 1879.
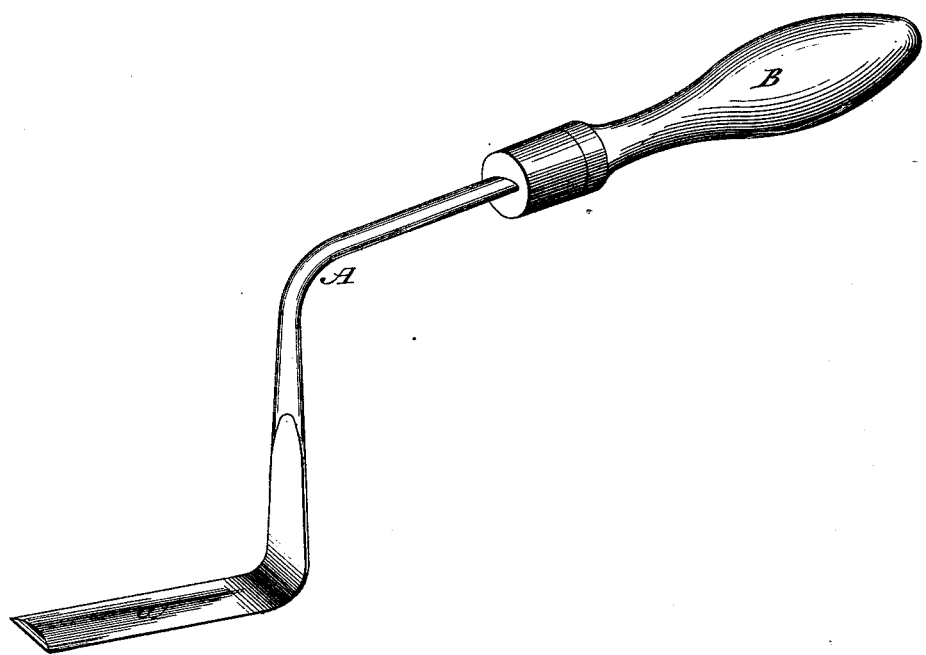

UNITED STATES PATENT OFFICE.

HENRY WHITE, OF QUINCY, CALIFORNIA.

IMPROVEMENT IN HAND WEEDING-TOOLS.

Specification forming part of Letters Patent No. 220,102, dated September 30, 1879; application filed May 25, 1878.

*To all whom it may concern:*

Be it known that I, HENRY WHITE, of Quincy, Plumas county, State of California, have invented an Improved Hand Weeding-Tool, of which the following is a specification.

My invention aims to provide a simple and effective tool for hand-weeding, which will enable the weeds to be readily cut away in small spaces between the plants without exposing the latter to injury either by the blade or the operating-handle of the tool, and which will at the same time permit of rapid and easy operation.

The figure in the annexed drawing presents a perspective view of my improved tool.

The tool is formed of a rod, A, of steel, one end of which is inserted in a handle, B, of suitable wood.

The steel rod may be either round or square; but in any case the end which is inserted in the handle is flattened to prevent the handle turning thereon.

It will be seen that the steel rod projects directly from the handle, in line therewith, and that about midway it is cranked or vertically bent in the direction of its projection from the handle, while it terminates in a thin flat blade, *a*, formed by flattening the extremity of the rod, which blade projects in a line parallel, or nearly so, with the handle, as shown. This blade is flat or level on its under surface, but beveled on its upper surface, both on the sides and end, to form sharp cutting-edges, so that the cutting or weeding action may be effected by either forward or side thrusts.

The bend in the rod at the stem of the blade is a right angle, as shown, while the bend near the handle is more than a right angle, so that this angle, together with the length of the crank in the rod, is such that the handle is raised from four to five inches above the cutting plane of the blade.

It will thus be seen that the cutting-blade projects freely in advance of the handle, and in line therewith, while the handle is raised well above the cutting end, so as to readily clear the tops of the growing plants, while a good command is obtained over the blade for effective execution in cutting off the weeds between the plants by movements forward or to the right or left, and which, as will be observed, may be effected very rapidly without danger of injuring the plants.

The end of the blade may also be readily inserted below the surface of the ground to remove strong weeds—such as the Canada thistle or yellow dock—which may thus be cut off at the root by the flat blade with great ease and precision.

The tool is well adapted for the weeding of all plants which are generally weeded by hand, and its use not only avoids the soiling of the hands, but enables the weeding to be more rapidly done, and, while being very simple and effective, it has the further advantage of being cheap.

I am aware of the Patents No. 31,977, of 1861, No. 96,740, of 1869, and No. 132,444, of 1872, which show hoes having, respectively, V-shaped, serrate-leaf-shaped, and square-shaped blades, and also No. 106,779, of 1870, which shows a shovel having a long blade of V-section; but these are all distinct from my weeding-tool, and I disclaim them.

What I claim is—

A hand weeding-tool formed of a metallic rod extending from a handle and terminating in a flat cutting-blade projecting in line with and in advance of the handle, the said rod being cranked midway to raise the handle above the plane of the blade, while the blade is reduced to cutting-edges on its end and sides, and adapted to cut off the weeds by forward or lateral thrusts above or below the surface of the ground, substantially as herein shown and described.

HENRY WHITE.

Names of reference—
 ANDREW JACKSON GOULD,
 FENTON PETERKIN WHITING.